(12) United States Patent
Ochi et al.

(10) Patent No.: US 6,863,184 B2
(45) Date of Patent: Mar. 8, 2005

(54) FILTRATION APPARATUS

(75) Inventors: Masao Ochi, Osaka (JP); Katsushi Hamada, Osaka (JP)

(73) Assignee: Kurabo Industries Ltd., Kurashiki (JP)

( * ) Notice: Subject to any disclaimer, the term of this patent is extended or adjusted under 35 U.S.C. 154(b) by 104 days.

(21) Appl. No.: 09/996,517

(22) Filed: Nov. 28, 2001

(65) Prior Publication Data

US 2002/0066697 A1 Jun. 6, 2002

(30) Foreign Application Priority Data

Oct. 29, 2001 (JP) .......................................... 2001-331192
Dec. 4, 2002 (JP) .......................................... 2000-368667

(51) Int. Cl.[7] ............................................... B01D 35/30
(52) U.S. Cl. ...................................... 210/443; 210/450
(58) Field of Search ................................. 210/440, 443, 210/444, 450, 435; 220/304, 288; 285/331

(56) References Cited

U.S. PATENT DOCUMENTS

| | | | | |
|---|---|---|---|---|
| 2,720,278 A | * | 10/1955 | Wiley | ............................ 55/318 |
| 3,428,208 A | * | 2/1969 | Kosar | .......................... 220/288 |
| 5,022,986 A | | 6/1991 | Lang | |
| 5,154,827 A | * | 10/1992 | Ashelin et al. | ............. 210/490 |
| 5,609,757 A | * | 3/1997 | Schiavo et al. | ............. 210/232 |

FOREIGN PATENT DOCUMENTS

| | | | | |
|---|---|---|---|---|
| DE | 2222004 A | * | 11/1973 | ........... B01D/29/20 |
| EP | 0318079 | | 5/1989 | |
| GB | 2193112 | | 2/1988 | |
| JP | 10337447 | | 12/1998 | |
| JP | 2000153111 | | 6/2000 | |
| JP | 2000153112 | | 6/2000 | |
| JP | 2000325712 | | 11/2000 | |

* cited by examiner

*Primary Examiner*—Matthew O. Savage
(74) *Attorney, Agent, or Firm*—W. F. Fasse; W. G. Fasse (57) ABSTRACT

There is provided a filtration apparatus superior in durability dispensing with an O ring otherwise employed to attach a bowl. The apparatus includes a housing head, a housing bowl detachably attached to the housing head and surrounding a cartridge filter circumferentially to define a channel wall, and clamping means exerting force to press the housing head and bowl against each other to clamp the head and bowl together. The housing head has a portion facing the housing bowl and having a sealing portion. The housing bowl has a sealing portion providing a seal when the clamping means exerts force to allow the sealing portion of the bowl to abut directly against the sealing portion of the head.

6 Claims, 10 Drawing Sheets

FILTRATION APPARATUS

BACKGROUND OF THE INVENTION

1. Field of the Invention

The present invention relates generally to filtration apparatus for use in the fields for example of semiconductor, foods and chemicals and more specifically to highly durable filtration apparatus ensuring precision filtration and in addition dispensing with an O ring used for a sealing portion for attaching a housing bowl.

2. Description of the Background Art

In a variety of fields manufacturing electronic components, foods, chemicals, pure water and the like, filtration apparatus are widely used to provide precision filtration. Electronic components are washed with agents having high levels of purity. For example if such an agent is contaminated for example with metal particles in particular and it is used to wash micro-fabricated semiconductor integrated circuits, the circuits would have interconnections with short-circuit or the like introduced therebetween and they would not be expected to function normally. On the other hand for example agents employed to wash products in semiconductor fabrication can be used repeatedly and in terms of resource conservation, environmentalism and reduction of semiconductor device fabrication cost the washing agent is circulated and reused. In doing so, metal particles and the like are introduced during the process of washing and agent recovery, as described above, and the contaminant is removed with a filter. The filter, initially clean, is contaminated in use by non-filtrate over time and clogged in time and eventually can no longer provide sufficient filtration. Thus the filtration apparatus described above employs a filter having filtration capability dropping to a predetermined level over a period of time and when the period of time elapses the filter is exchanged with a new filter. Whenever filters are exchanged, the filtration apparatus is unsealed and disassembled to exchange the cartridge filter.

Figure 12:
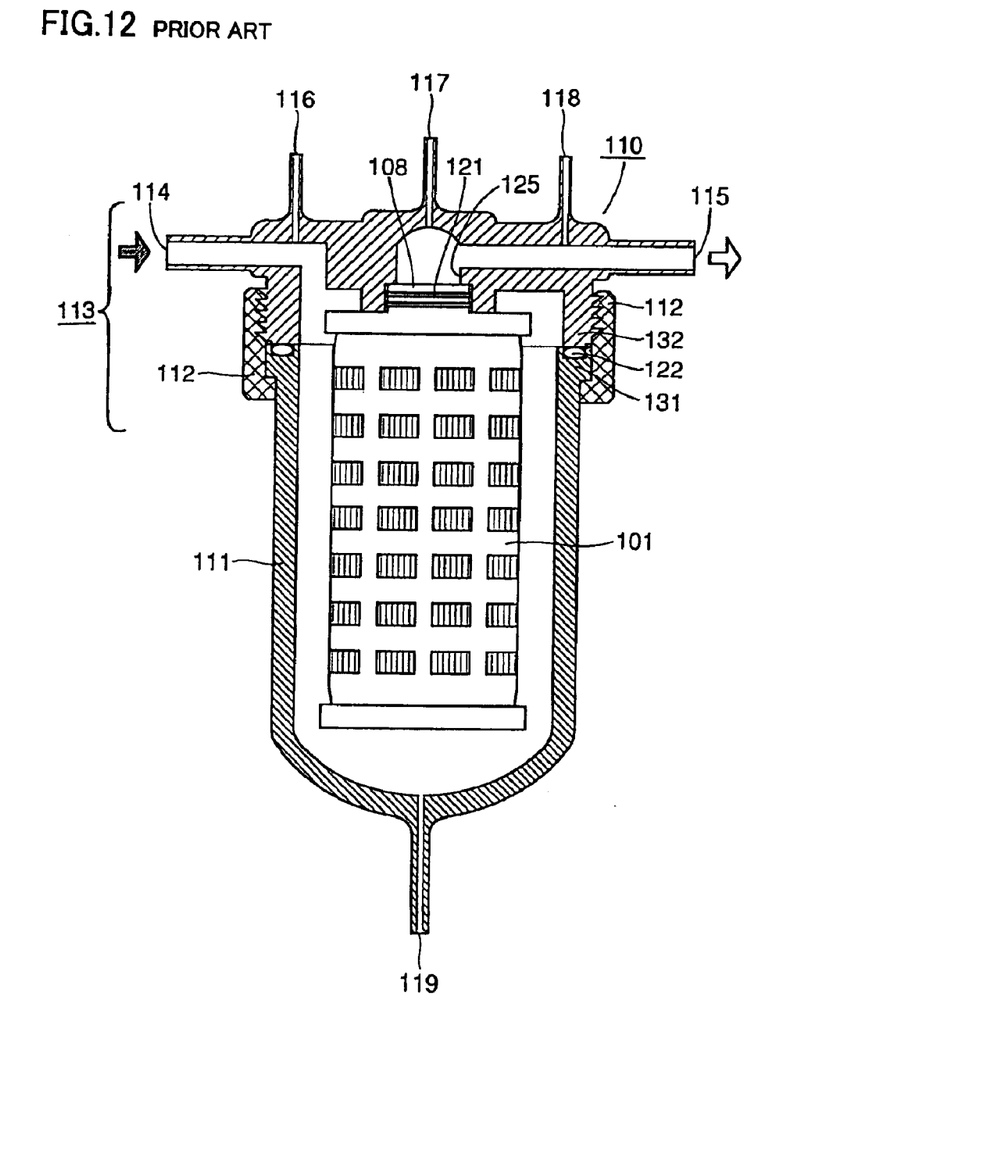
FIG. 12 shows a conventional structure of a seal of a filtration apparatus.

FIG. 12 illustrates a conventional filtration apparatus including a housing head 110 having an inlet 114 and an outlet 115, a cartridge 101 detachably attached to the housing head, and a housing bowl 111 surrounding the cartridge to define a channel wall. Housing head 110 and housing bowl 111 cooperate to form a housing 113. A filter attachment 108 with an O ring 121 fitted thereon is fitted into a filter attachment 125 in the housing head to allow cartridge filter 101 to provide a seal and also be detachably attached. Housing bowl 111 has an upper end provided with an O ring recess 131 receiving an O ring 122 which abuts against a flange 132 protruding from the housing head downward and a cap nut 112 is screwed to clamp it. Thus, the O ring and an end of the flange pushes each other to provide a seal. In other words, the apparatus is sealed between O ring 122 and flange 132. The housing head has an air vent and a pressure gauge connection 116, 117, 118 and housing bowl 111 has an effluent port 119.

Inlet 114 introduces a fluid to be filtered, and as it passes through cartridge filter 101 the fluid is filtrated therethrough and it then passes through filter attachment 125 and finally it is output through outlet 115.

For the filtration apparatus as described above, however, when cartridge filter 101 is exchanged, O ring 122 providing a seal is conventionally also exchanged to thoroughly prevent introduction of particles. For example, O ring 122 formed of a simple substance of fluororubber is extremely expensive and if an O ring has an internal portion of rubber and an external portion of fluororesin the cost still would be relatively high. Exchanging such an expensive O ring whenever a cartridge filter is exchanged is not preferable as such would impair cost-competitiveness. Furthermore, it is neither preferable ecologically as it increases refuse. Furthermore, if the O ring is not formed of fluororubber, the exact O ring can act as a contaminant introducing particles or other foreign matters. Thus there has been a demand for a filtration apparatus developed to have a sealing structure free from frequent exchange of an O ring providing a seal between a housing head and a housing bowl, or dispensing with such exchange.

SUMMARY OF THE INVENTION

The present invention contemplates a filtration apparatus having a sealing portion superior in durability as it can dispense with an O ring providing a seal for attaching a housing bowl and it can also be free from particles and the like otherwise introduced when a cartridge filter is exchanged or on other occasions.

The present filtration apparatus includes: a housing head having an inlet and an outlet; a housing bowl detachably attached to the housing head and surrounding a cartridge filter to define a channel wall; and clamping means exerting force to press the housing head and the housing bowl against each other to clamp the housing head and the housing bowl together. The housing head has a portion facing the housing bowl and having a sealing portion. The housing bowl has a sealing portion providing a seal when the clamping means exerts force to allow the sealing portion of the housing bowl to abut directly against the sealing portion of the housing head.

The sealing portion of the housing head and that of the housing bowl can abut directly against each other. Thus the apparatus can dispense, with an O ring and can employ a simple structure to have the seal. Thus the apparatus can be free of contaminants otherwise introduced from an O ring. Furthermore, the absence of the O ring contributes to a reduction of the cost for the components of the apparatus.

In the present filtration apparatus, the sealing portion of the housing head and that of the housing bowl can each extend in the form of a ring, one a protrusion and the other a recess abutting against the protrusion, and the seal can be at least two circular seals.

The at least two circular seals can provide a significantly steady seal. For example, if the apparatus filtrates thermal sulfuric acid it can filtrate the acid safely. The two "circular seals" means no more than a circular portion and the line as seen in cross section has a dimension and it is not a line in the strict sense. In other words, any material used is capable of more or less elastically deforming and the force exerted by the clamping means elastically deform the seal to have a dimension.

Thus the apparatus can be reliably sealed without an O ring and it no longer requires an expensive O ring to be exchanged. The apparatus can also be free from the possibility that it will suffer contaminants otherwise introduced from an O ring. Thus there can be provided a filtration apparatus having a sealing portion for attaching the housing bowl that is inexpensive and suitable for superprecision filtration. Furthermore the protrusion and the recess can readily be provided through extrusion employing a die. In other words, they can be produced at the same level of cost as required for processing a conventional O ring recess. Furthermore the apparatus can readily be disassembled and reassembled in exchanging cartridge filters. Thus the apparatus can dispense with an O ring to have a reliable seal.

In the present filtration apparatus when the recess and the protrusion are pressed against each other the recess is increased in width elastically and has resilience allowing the recess to cooperate with the protrusion to provide the seal.

When the protrusion is pushed into the recess by the clamping means the recess can elastically deform and increase in width and its resilience allows two reliable seals to be provided between the recess and the protrusion. This can significantly facilitate the production of the apparatus and the assembly and disassembly of the same.

In the present filtration apparatus, one of the sealing portions of the housing head and bowl is a protrusion and the other is a surface receiving the protrusion pressed there against to elastically deform and thus allow the receiving surface to cooperate with the protrusion to provide a seal.

The protrusion and the receiving surface can be pressed against each other and the receiving surface thus pressed can elastically warp and its resilience allows it to cooperate with the protrusion to provide the seal. This seal is also not completely linear and the abutment elastically deforms to provide the seal in the form of a strip. In this portion in the strip, the large magnitude of force exerted results in reactive force and as a result frictional force is produced along the sealing plane. Thus the protrusion and the receiving surface do not slide on each other and can thus maintain a steady, relative positional relationship therebetween. Thus the apparatus can dispense with an O ring between the housing head and the housing bowl to have a reliable seal. Thus the apparatus can have a seal having a simple structure to reduce the cost for processing components related to the seal. Furthermore in exchanging cartridge filters a member associated therewith can be exchanged at a reduced cost and the apparatus can also be free of particles and other similar foreign matters adhering for example on an O ring recess and thus entering the apparatus. The apparatus can reduce refuse and it can thus also be ecologically preferable.

In the present filtration apparatus the receiving surface is recessed.

The receiving surface that is recessed is advantageous; the protrusion and the receiving surface abut against each other and when elastic deformation starts and the aforementioned frictional force still has a small magnitude the recessed receiving surface can contribute to elimination of unsteadiness such as sliding. Furthermore, by providing the protrusion having an end adapted to the recess of the receiving surface, after the elastic deformation the seal can be provided by the portion in the strip that is arcuate, as seen in the cross section traversing as aforementioned, to increase its substantial width in length or its arc in length. Consequently the apparatus can be reliably sealed.

In the filtration apparatus the housing head, the cartridge filter and the housing bowl are all formed of fluororesin.

Thus contaminants introduced from the apparatus can be minimized and consequently ultra-high purity filtration can be achieved. A conventional filtration apparatus employs an O ring of fluororubber and it is thus significantly expensive. The present filtration apparatus can be manufactured at a lower cost than typical, conventional filtration apparatus and if it is the ultra-high purity filtration apparatus it can be manufactured at a maximally reduced cost.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIGS. 5A and 5B show a structure of sealing portions of the filtration apparatus of a second embodiment of the present invention. More specifically.

DESCRIPTION OF THE PREFERRED EMBODIMENTS

Hereinafter the embodiments of the present invention will be described with reference to the drawings.

First Embodiment

Figure 1:
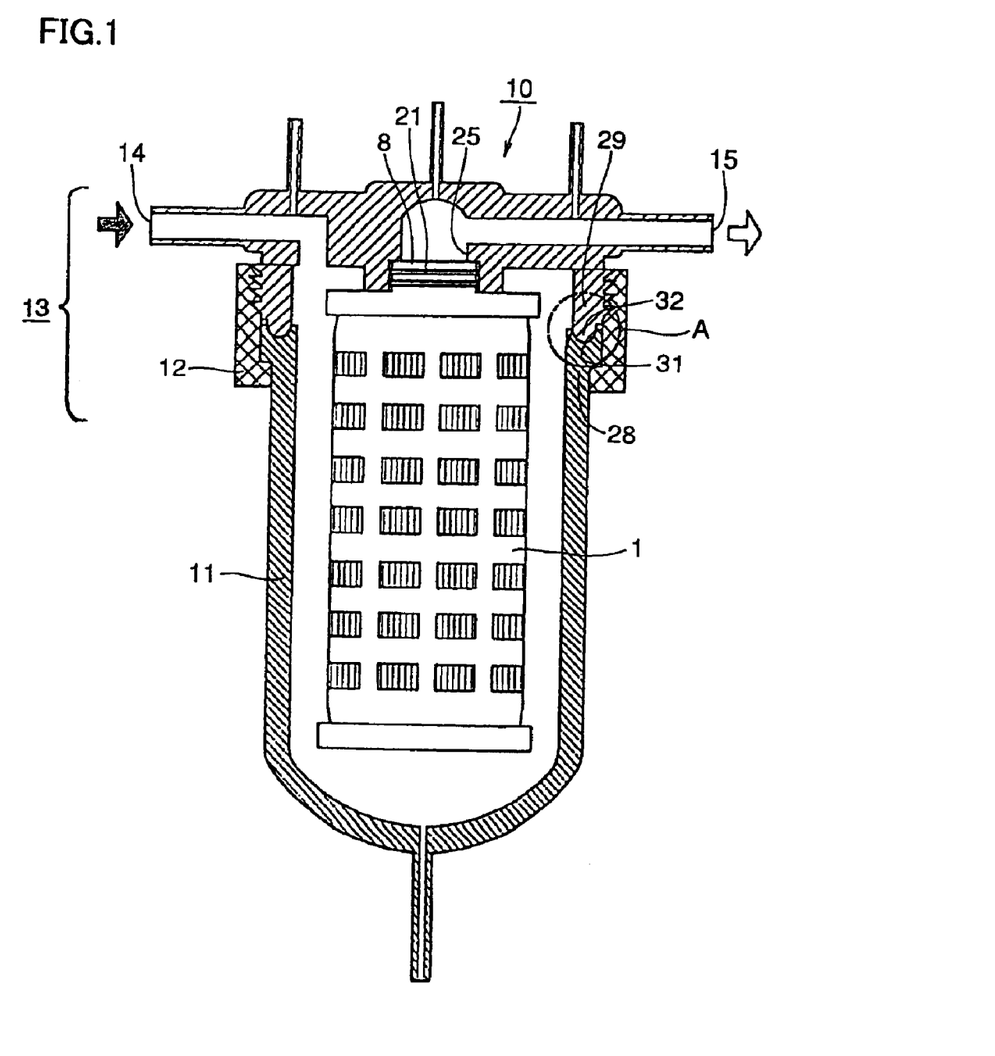
FIG. 1 shows a filtration apparatus of a first embodiment of the present invention.

FIG. 1 shows a filtration apparatus including a housing head 10 having an inlet 14 and an outlet 15, a cartridge filter 1 arranged in a channel between the inlet and the outlet for filtration, and a housing bowl 11 surrounding the cartridge filter to define an external wall for the channel. Housing head 10 and housing bowl 11 together form a housing 13. Housing bowl 11 engages with a cap nut 12 and when it is clamped by the cap nut screwed the housing bowl has an upper end 28 abutting against a flange 29, a protrusion of the housing head, to provide a seal. The housing head's sealing portion, or a protrusion 32 of the flange, is fitted into the housing bowl's sealing portion, or a recess 31 of upper end 28. Cap nut 12 is a clamping means producing a force to provide the seal and it also attaches and thus fixes housing bowl 11 to housing head 10.

The housing head, housing bowl and cartridge filter's upper and lower caps, cylinder and the like are formed of PFA and the pleated filter is formed of PTFE and the cap nut is formed of PVDF. Furthermore, O rings 21 fitted on the cartridge filter are both formed of fluororubber. The above materials are all either fluororesin or fluororubber, one of the best constituent materials resistant to corrosion.

Figure 2:
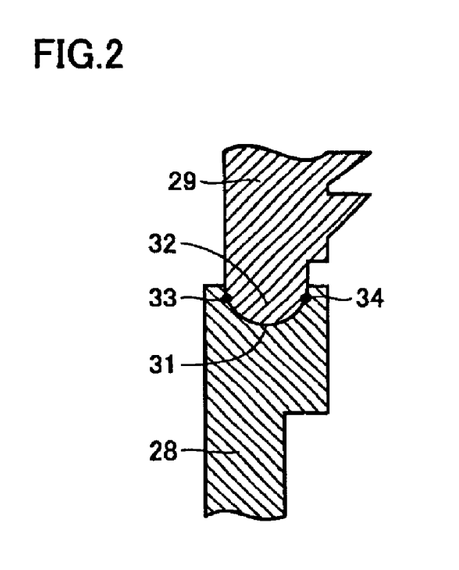
FIG. 2 is an enlarged view of a portion A shown in FIG. 1.

FIG. 2 is an enlarged view of a portion A shown in FIG. 1. The housing bowl has upper end 28 provided with the housing bowl's sealing portion in the form of recess 31 receiving the housing head's sealing portion or protrusion 32. In FIG. 2, a width of protrusion 32, i.e., a thickness thereof as seen in a cross section traversing the aforementioned sealing line, is adapted to be slightly larger than that of recess 31 as seen in the cross section. As such, when protrusion 32 is pushed into recess 31, recess 31 slightly elastically deforms to spread its upper end and has resilience to provide an inner sealing point 33 and an outer sealing point 34, as shown in FIG. 2. Note that any other different number of sealing points may be provided and for example furthermore the top of the protrusion and the bottom of the recess may abut against each other and thus provide a total of three sealing points.

As shown in the axial cross-section of FIG. 2, the protrusion 32 has an overall convex curved arcuate shape including a radially inner convex arcuate portion pressing against an inner concave arcuate curved wall portion of the recess 31 to form the inner sealing point 33, and a radially outer convex arcuate portion pressing against an outer concave arcuate curved wall portion of the recess 31 to form the outer sealing point 34. Also, it should be understood that each one of the sealing points 33 and 34 forms a continuous circular or annular seal extending continuously circumferentially around the joint between the protrusion 32 and the recess 31. As shown in FIG. 2, the sealing points are formed at locations within a depth of the recess displaced away from terminal outer free edges of the recess wall portions.

Thus at least two sealing points can be provided to reliably seal the apparatus. Thus the apparatus can dispense with an O ring of expensive fluororubber and it can thus be sealed by a simple structure. This can reduce the cost for the components of the apparatus and that for processing the same and also prevent introduction of contaminants for example from an O ring. Furthermore, the apparatus is ecologically preferable as it can reduce refuse.

Second Embodiment

Figure 5A:
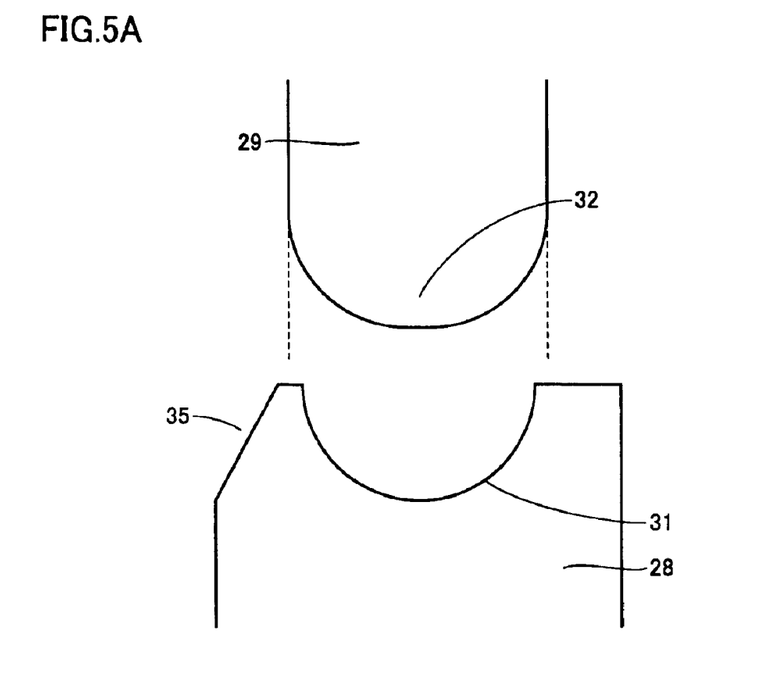
FIG. 5A shows an upper end of the housing bowl and a flange of the housing head detached from each other and FIG. 5B shows the upper end of the housing bowl and a sealing portion together forming a seal.

The present invention in a second embodiment provides a seal structured such that the housing bowl has upper end 28 provided with a recess (the housing bowl's sealing portion) having a width smaller than a thickness of protrusion 32 of flange 29 (the housing head's sealing portion), as compared with the first embodiment. FIG. 5A shows the housing bowl's upper end 28 and flange 29 detached from each other and FIG. 5B shows upper end 28 and flange 29 pressed against each other to provide two sealing points 33 and 34 contacting the recess at upper end points and thus provided there as the protrusion is significantly large in thickness.

Figure 5B:
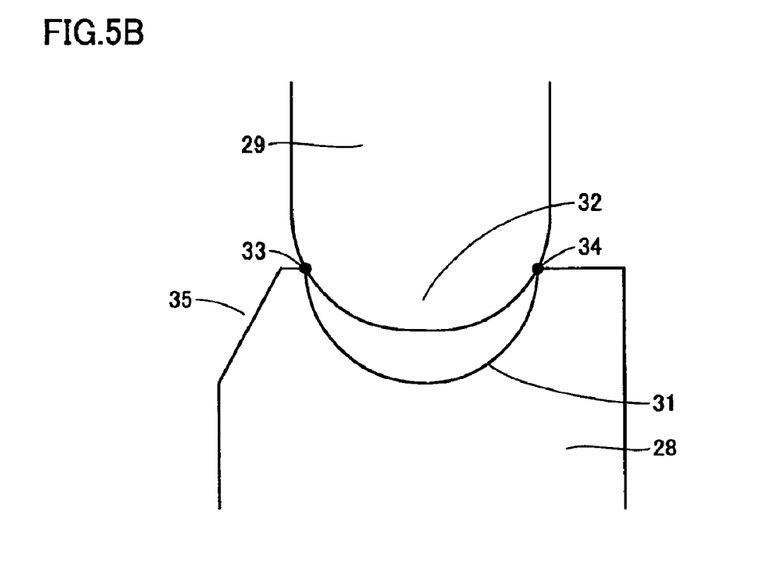

As shown in FIGS. 5A and 5B, a wall closer to inner sealing point 33 is partially removed to prevent fluid from pooling. The internal wall thus removed is less stiff and thus more elastic and when protrusions 32 is pushed into the recess a relatively small magnitude of force is sufficient to elastically deform the wall and resiliency is provided to facilitate the provision of sealing points 33 and 34.

The seal structured as above also ensures that the apparatus is reliably sealed without an O ring. It can also be as effective as the first embodiment as it can reduce the cost for the components of the apparatus and that for processing the same and prevent introduction of contaminants and it can also be ecologically suitable.

Third Embodiment

Figure 6:
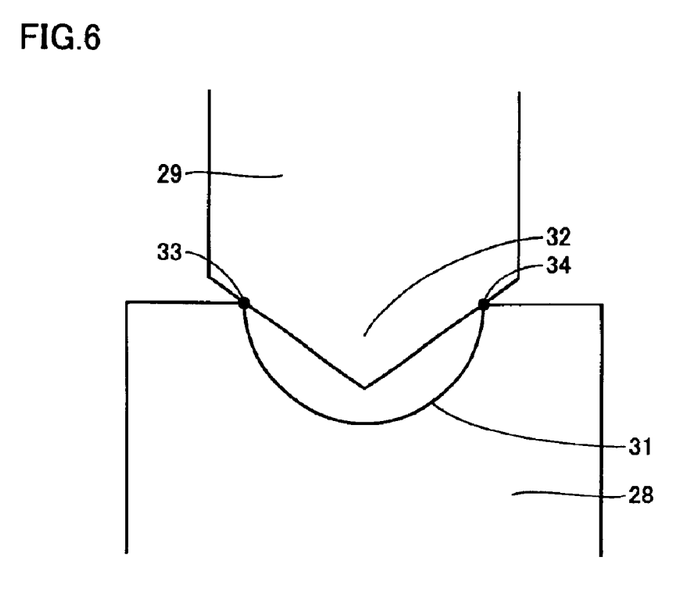
FIG. 6 shows a structure of the seal of the filtration apparatus of a third embodiment of the present invention.

With reference to FIG. 6, flange 29 has protrusion 32 protruding in the form of a knife edge, as seen in the cross section traversing as described above. The knife edge has a side pressed against an edge of the recess of upper end 28 of the housing bowl to provide sealing points 33 and 34 also provided at upper end points of the recess. The sealing structure as described above can provide an effect similar to that of the filtration apparatus of the first and second embodiments.

Fourth Embodiment

Figure 7:
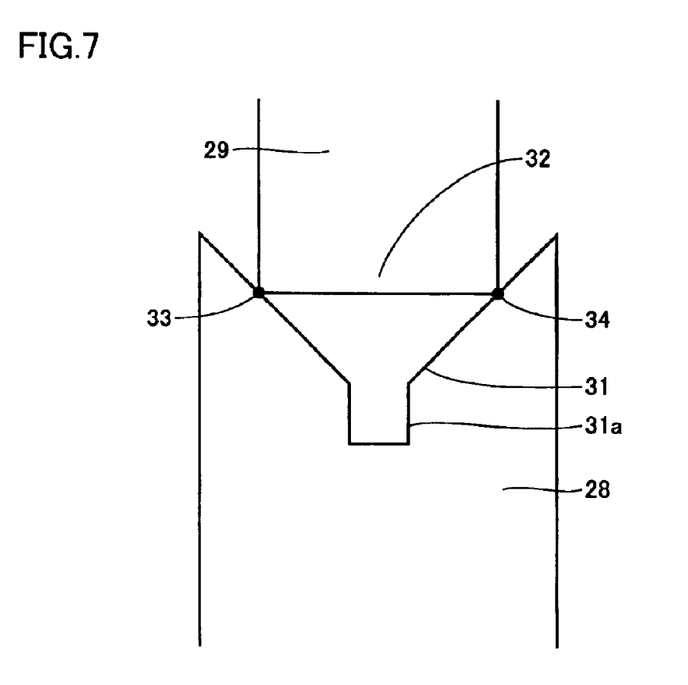
FIG. 7 shows a structure of the seal of the filtration apparatus of a fourth embodiment of the present invention.

With reference to FIG. 7, recess 31 is adapted to be larger in width than protrusion 32 of flange 29. Such an example can also provide sealing points 33 and 34 and thus satisfactorily seal the apparatus without an O ring. Herein, although protrusion 32 is the same as a width (a thickness of the plate) of the flange, it is also referred to as a "protrusion." Note that recess 31 is provided with a portion 31a alleviating stress concentration to prevent stress concentration from destroying it.

Fifth Embodiment

Figure 8:
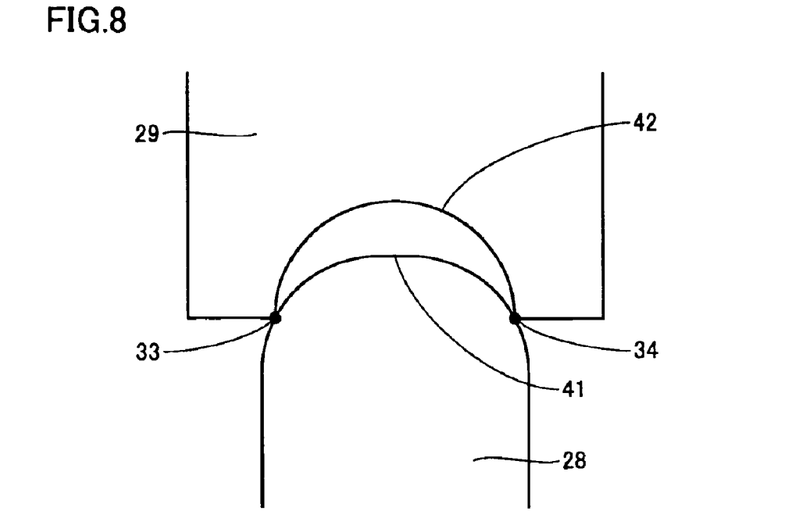
FIG. 8 shows a structure of the seal of the filtration apparatus of a fifth embodiment of the present invention.

FIG. 8 shows a seal with flange 29 having an end surface provided with a recess 42 (corresponding to the housing head's sealing portion). On the other hand, the housing bowl has upper end 28 provided with a protrusion 41 (corresponding to the housing bowl's sealing portion) to be fitted into recess 42 of the flange. This can also provide two sealing points 33 and 34 and thus ensures that the apparatus is sealed without an O ring.

Sixth Embodiment

Figure 9:
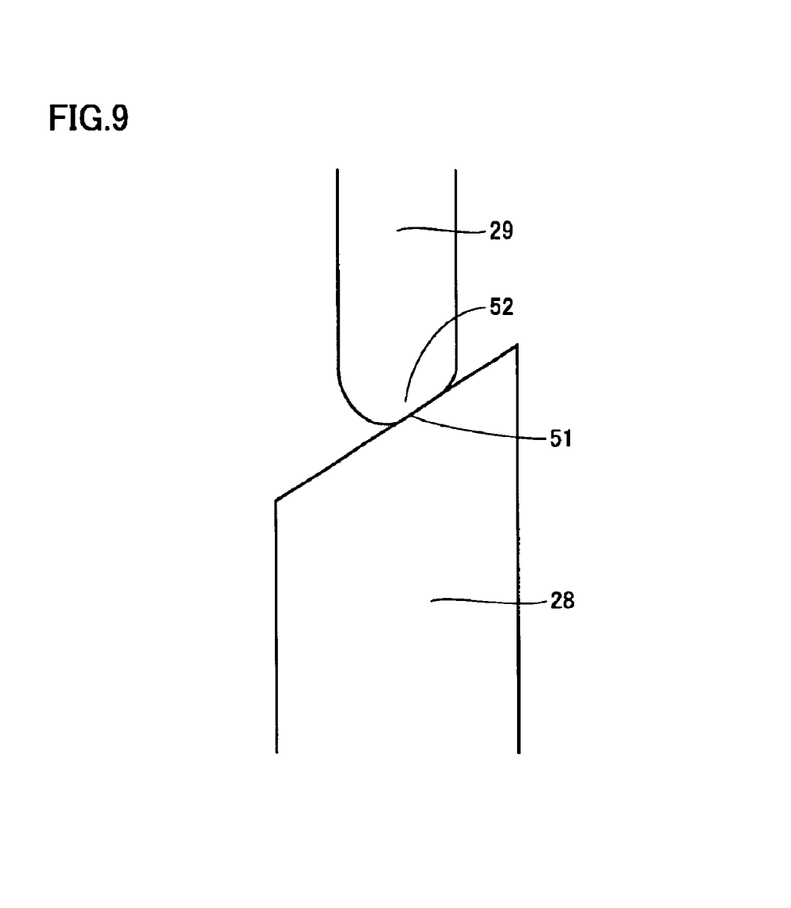
FIG. 9 shows a structure of the seal of the filtration apparatus of a sixth embodiment of the present invention.

With reference to FIG. 9, the housing bowl has upper end 28 provided with a receiving surface 51 against which abuts a protrusion 52 of an end of flange 29. Upper end 28 elastically warps and its resilience provides a seal. Since the abutment elastically deforms, the seal is provided in a strip. Such a simple structure can also provide a seal satisfactorily sealing the apparatus. The seal as described above thus ensures that the apparatus is reliably sealed without an O ring. It can also be as effective as the first to fifth embodiments as it can reduce the cost for the components of the apparatus and that for processing the same and prevent introduction of contaminants and it can also be suitable ecologically.

Seventh Embodiment

Figure 10:
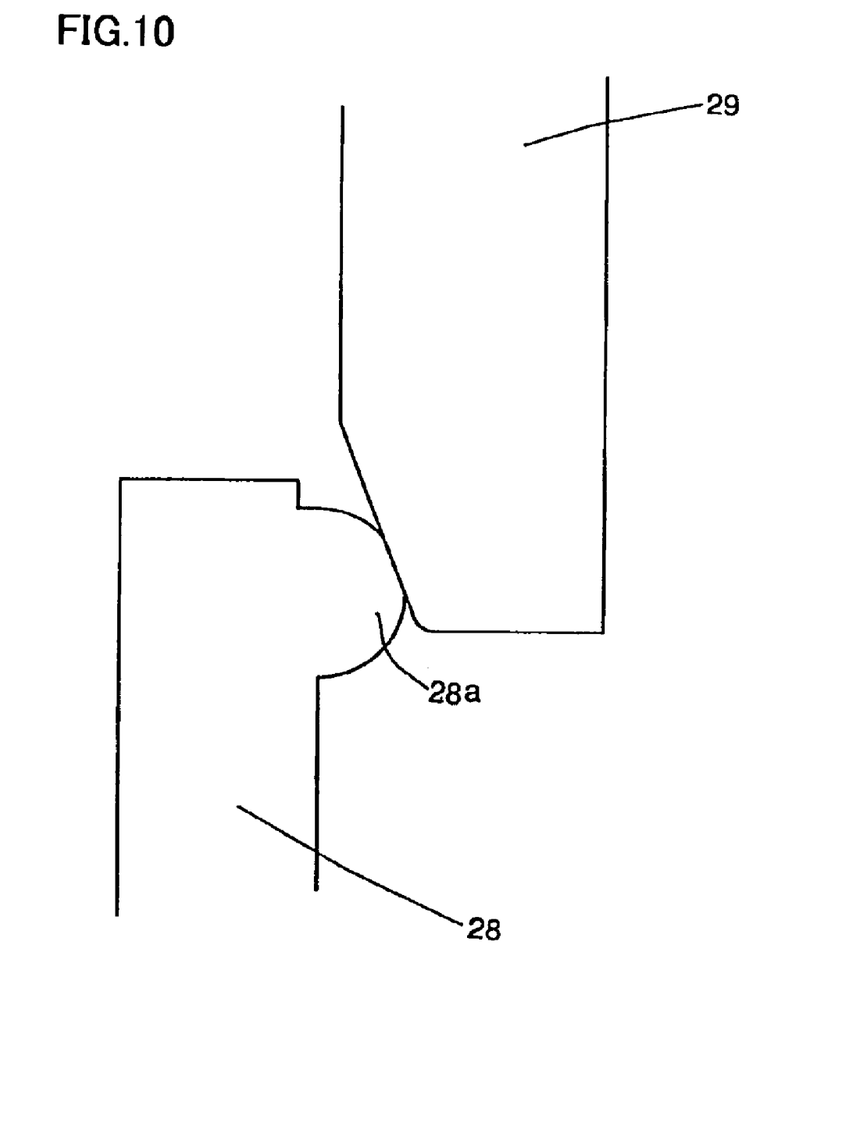
FIG. 10 shows a structure of the seal of the filtration apparatus of a seventh embodiment of the present invention.

In the present embodiment, as shown in FIG. 10, the housing bowl has upper end 28 having an outer side provided with a protrusion 28a protruding outwards and abutting against flange 29 of the housing head. In this abutment, flange 29 elastically warps outwards and protrusion 28a is pushed inwards and their repulsive forces allow the seal to be firm. Since the abutment has relatively significant elastic deformation, the abutment plane has a large area. As such, although simple in structure, the seal can be firm, with good reproducibility. Such a sealing structure ensures that the apparatus is reliably sealed without an O ring. It can also be as effective as the first to sixth embodiments as it can reduce the cost for the components of the apparatus and that for processing the same and prevent introduction of contaminants and it can also be suitable ecologically.

Figure 11A:
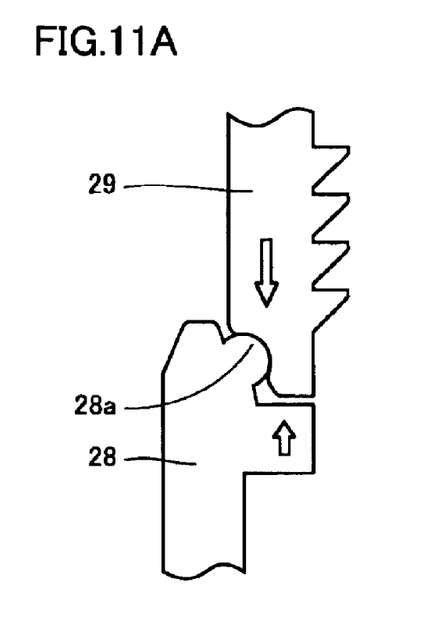
FIG. 11A shows a structure of the seal of the filtration apparatus of the seventh embodiment, varying as the sealing portions have a spherical surface.
Figure 11B:
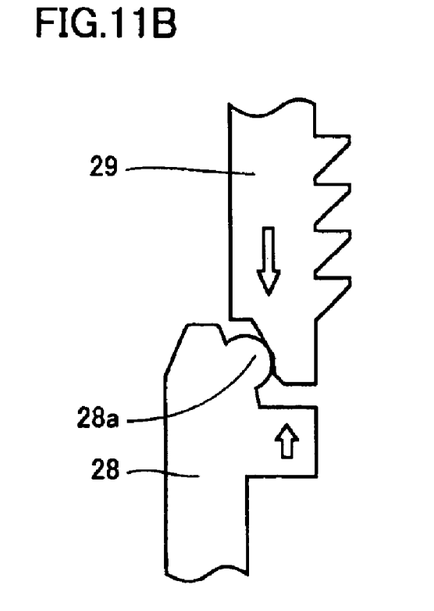
FIG. 11B shows a structure of the seal of the filtration apparatus of the seventh embodiment, further varying as the sealing portions have an inclined surface.

As a variation of the seventh embodiment, the seal has a structure as shown in FIGS. 11A and 11B. In the FIG. 11A seal, the flange has a seal forming portion recessed, round or angled, and the housing bowl has an upper end provided with a spherical protrusion 28a. They are engaged with and thus abut against each other to provide a significantly firm seal. Furthermore, as shown in FIG. 11B, flange 29 has an end generally recessed and it also has a planar, inclined surface against which abuts the protrusion of the upper and of the housing bowl. The abutment of a planar inclined surface and a spherical protrusion is hardly damaged and it can provide a highly durable seal.

Estimation of Seal for Sealability

The filtration apparatus of each of the first to seventh embodiments had its seal estimated for sealability in the following manner:

Housing head 10 and housing bowl 11 were pressed against each other with a predetermined magnitude of force to provide a seal for estimation. The seal had a diameter of 110 mm and the head and the bowl were pressed against each other with a force of 1200N. The head and the bowl pressed against each other were then immersed in a water tank and gaseous nitrogen of a pressure of 0.1 MPa was introduced through inlet 14 and output through outlet 15, while the filtration apparatus was estimated for whether the nitrogen leaked from the seal. An estimation was obtained that the filtration apparatus of the first to seventh embodiments were all free of leakage of the gaseous nitrogen.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A filtration apparatus comprising:
    a housing head having an inlet and an outlet;
    a housing bowl detachably attached to said housing head and surrounding a cartridge filter to define a channel wall; and
    a releasable clamping device that exerts a force to press said housing head and said housing bowl against each other to clamp said housing head and said housing bowl together, wherein:
    said housing head has a ring-shaped first sealing portion that faces said housing bowl;
    said housing bowl has a ring-shaped second sealing portion that abuts directly against said first sealing portion when said clamping device exerts said force to press said housing head and said housing bowl against each other;
    one of said first and second sealing portions is a protrusion and another of said first and second sealing portions is a recess;
    with respect to an axial section along a cylindrical axis line of said housing head and said housing bowl, said protrusion has a radially inner convex arcuate curved protrusion surface and a radially outer convex arcuate curved protrusion surface;
    said recess is bounded by a radially inner recess wall portion and a radially outer recess wall portion;
    said radially inner convex arcuate curved protrusion surface presses against said radially inner recess wall portion to form a first inner circular seal, and said radially outer convex arcuate curved protrusion surface presses against said radially outer recess wall portion to form a second outer circular seal, wherein said circular seals are formed at locations within a depth of said recess displaced away from terminal outer free edges of said recess wall portions; and
    wherein said radially inner recess wall portion and said radially outer recess wall portion each have a concave arcuate curved shape with respect to said axial section.

2. The filtration apparatus according to claim 1, wherein said radially inner and radially outer convex arcuate curved protrusion surfaces are portions of an overall convex curved sectional shape of said protrusion with respect to said axial section.

3. The filtration apparatus according to claim 1, wherein said radially inner and radially outer recess wall portions are portions of an overall concave curved sectional shape of said recess with respect to said axial section.

4. The filtration apparatus according to claim 1, excluding any O ring between said housing head and said housing bowl.

5. The filtration apparatus according to claim 1, wherein, when said recess and said protrusion are pressed against each other, said recess is increased in width elastically and has resilience allowing said recess to cooperate with said protrusion to form said seals.

6. The filtration apparatus according to claim 1, wherein said housing head, said cartridge filter and said housing bowl are all formed of a fluororesin.

* * * * *

UNITED STATES PATENT AND TRADEMARK OFFICE
CERTIFICATE OF CORRECTION

PATENT NO.    : 6,863,184 B2
DATED         : March 8, 2005
INVENTOR(S)   : Ochi et al.

Figure 3:
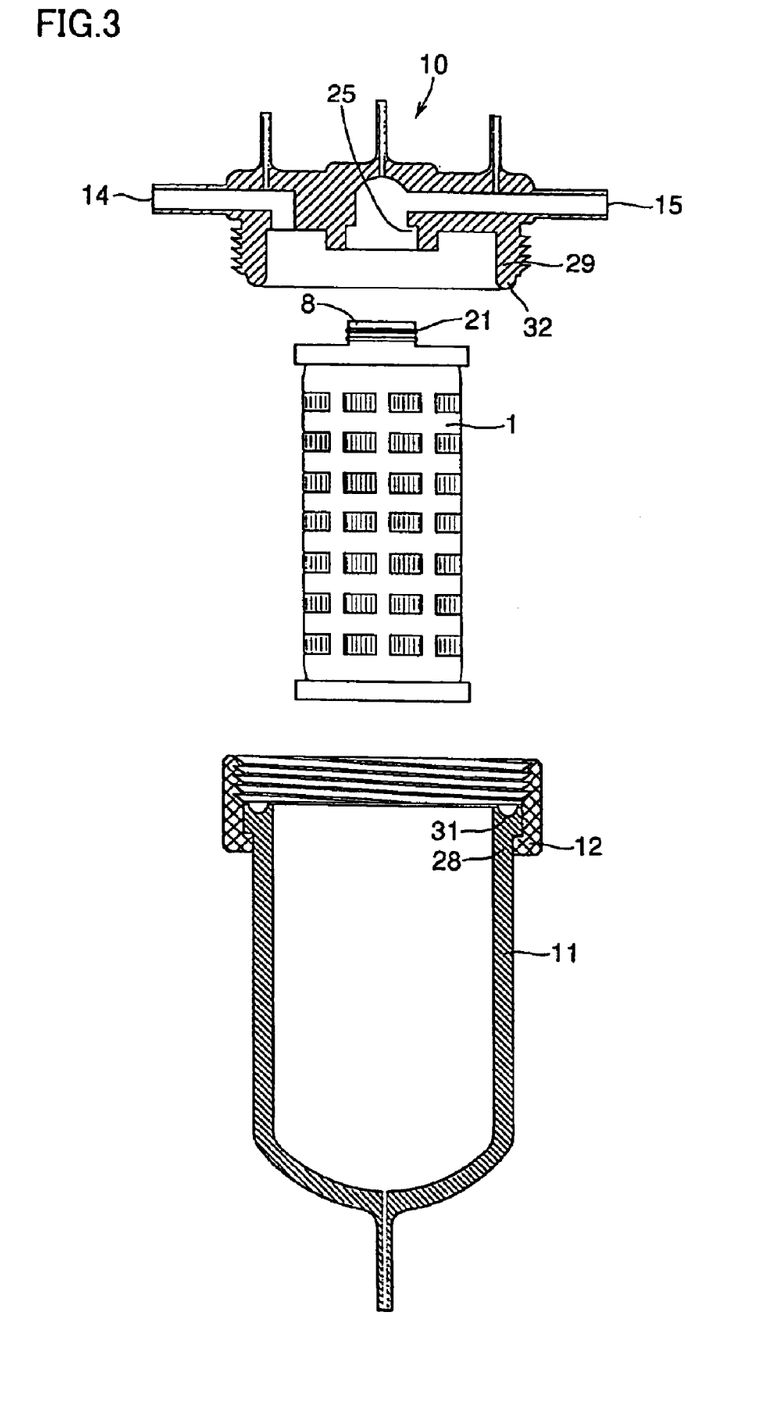
FIG. 3 shows a cartridge filter being attached to a housing head of the filtration apparatus of the first embodiment.
Figure 4:
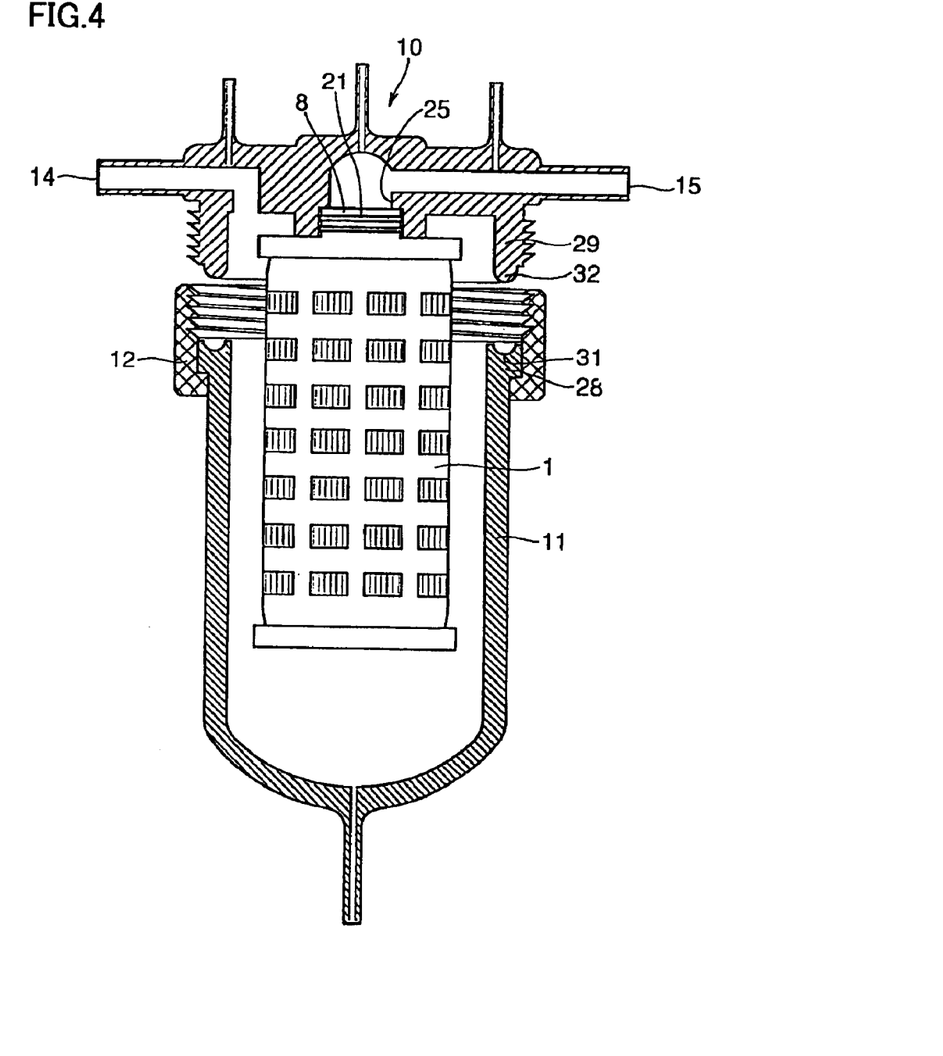
FIG. 4 follows FIG. 3, showing a housing bowl being attached to the housing head.

It is certified that error appears in the above-identified patent and that said Letters Patent is hereby corrected as shown below:

Title page,
Item [73], Assignee, replace "Kurashiki" by -- Kurashiki-shi --;
Item [30], Foreign Application Priority Data, replace "December 4, 2002" by -- December 4, 2000 --;

Column 3,
Lines 15 and 16, after "pressed", replace "there against" by -- thereagainst --;

Column 5,
Between Lines 29 and 30 insert the following paragraph:
-- Fig. 3 shows a cartridge filter being attached to the housing head. The cartridge filter has an attachment 8 with two O rings 21 fitted thereon. The O rings are fitted in housing head 10 at a filter attachment 25 to allow cartridge filter 1 to be detachably incorporated into the filtration apparatus. Fig. 4 shows housing bowl 11 being attached to the housing head 10 with cartridge filter 1 attached thereto, as described above. Cap nut 21 engages with housing bowl 11 at upper end 28. The cap nut is screwed along the thread of flange 29 of housing head 10 to fit protrusion 32 of the flange into recess 31 of upper end 28. This provides a seal provided by sealing points 33 and 34 shown in Fig. 2. --;

Column 8,
Line 36, after "any", replace "O ring" by -- O-ring --.

Signed and Sealed this

Twenty-eighth Day of June, 2005

JON W. DUDAS
*Director of the United States Patent and Trademark Office*